United States Patent Office 3,026,865
Patented Mar. 27, 1962

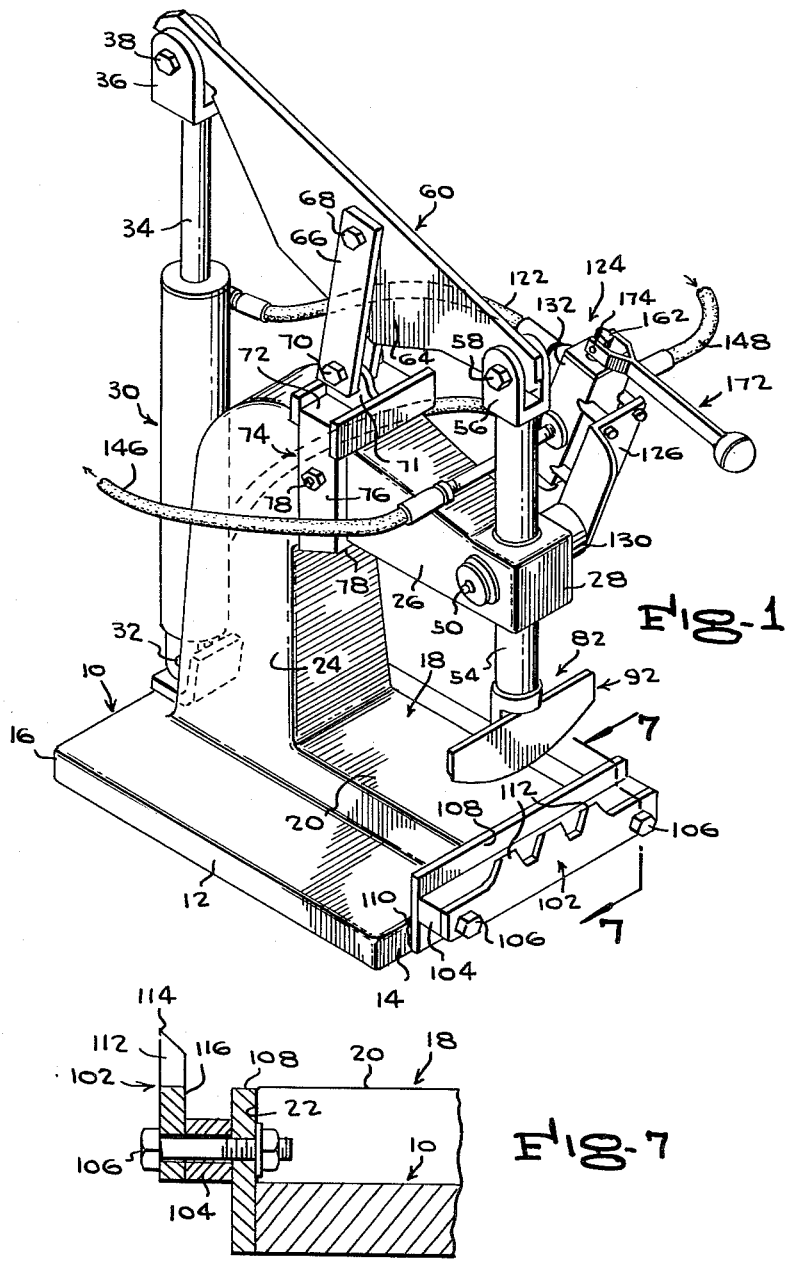
INVENTOR.
KAZUICHI SUNADA

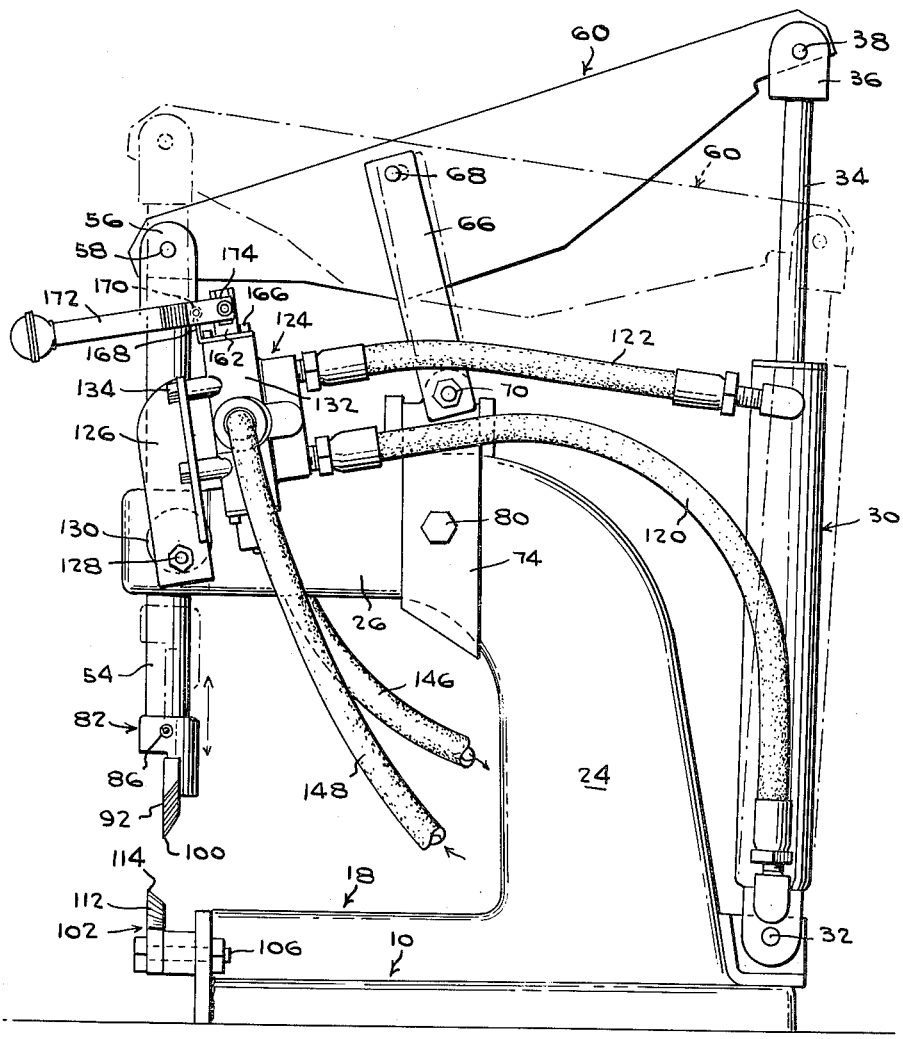

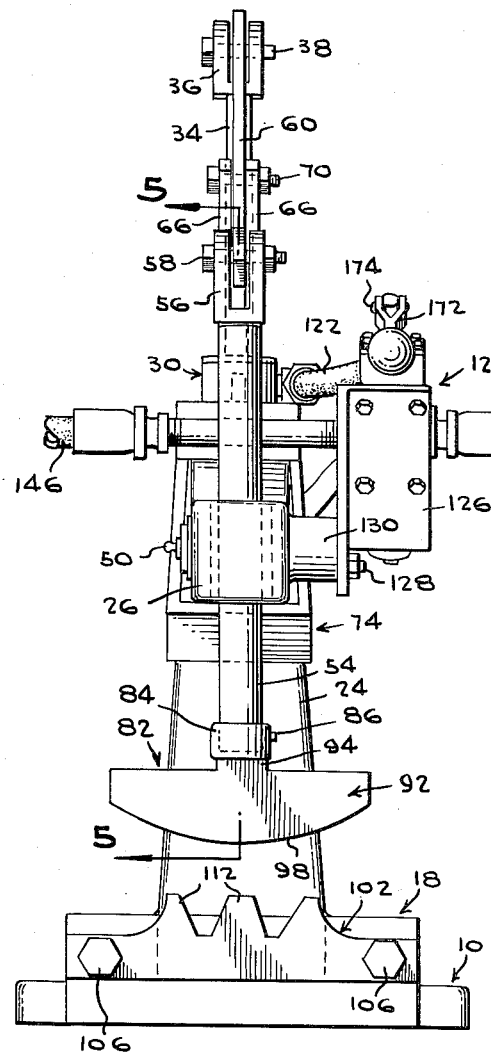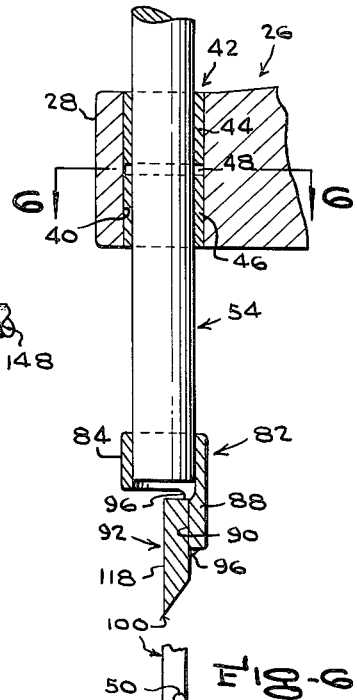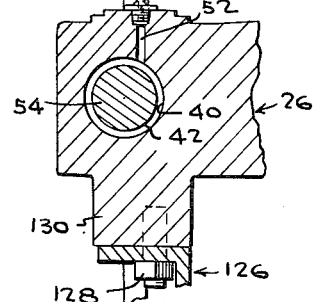

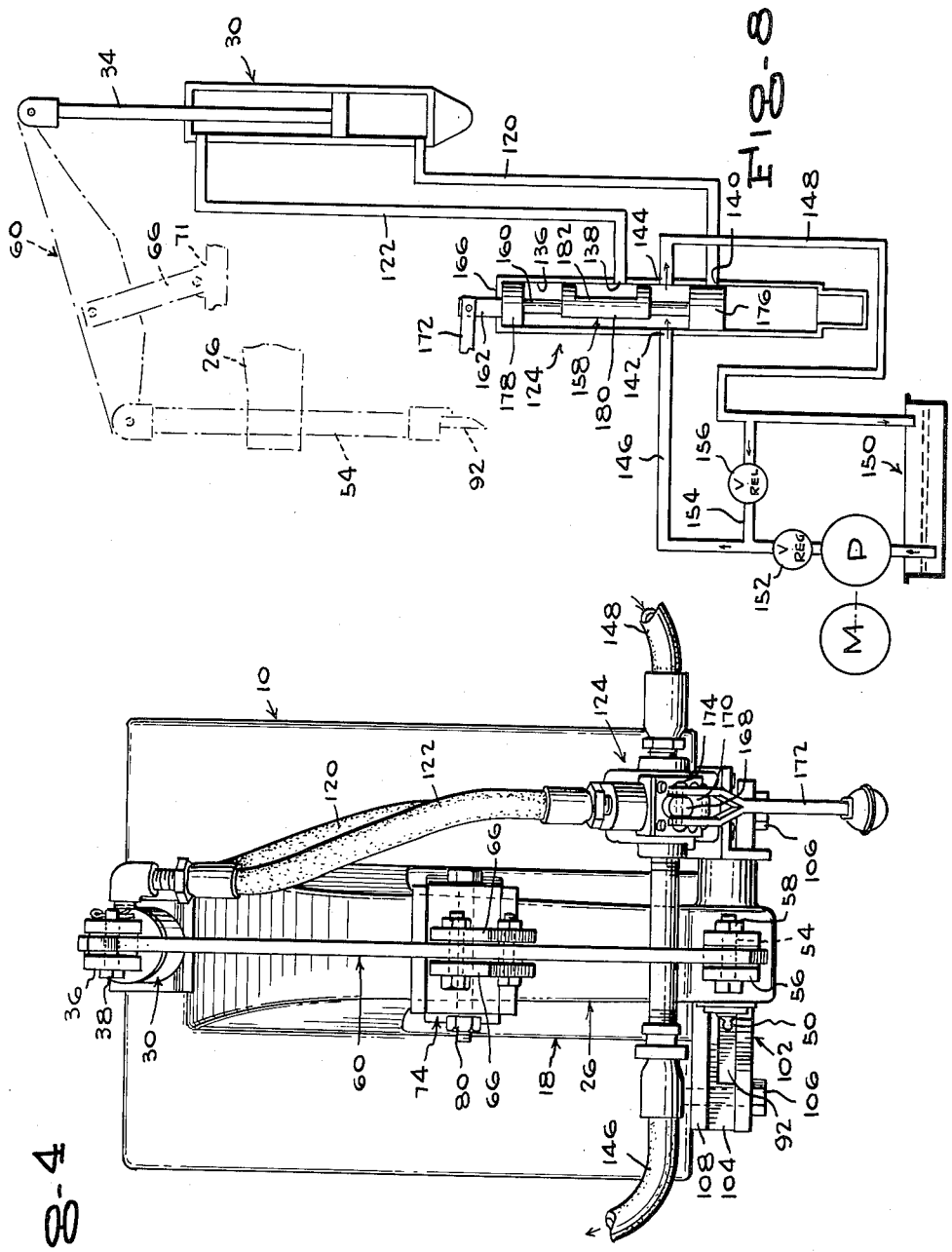

3,026,865
STONE CUTTER
Kazuichi Sunada, 91-2106 F Fort Weaver Road,
Ewa, Oahu, Hawaii
Filed May 12, 1961, Ser. No. 109,681
11 Claims. (Cl. 125—23)

This invention relates to improvements in cutting machines, and more particularly to a novel power-operated cutter for cutting soft stone, such as volcanic rock, sand stone, and the like.

The primary object of the invention is the provision of a more efficient and practical cutter of the kind indicated, which is designed for commercial and industrial use, wherein the force of application of the cutting blade to the stone can be accurately regulated and increased or decreased.

Another object of the invention is the provision, in a cutter of the character indicated above, of a ram shaft which works in a rectilinear path and at right angles to the stone to be cut, which carries a novel fixed cutting blade having a shearing edge which is convexly curved, lengthwise of the blade, for more efficient and effective cutting of stone.

A further object of the invention is the provision of a stone cutter of the character indicated above, wherein the ram shaft works through an arm spacedly overlying the bed of the cutter, and is moved upwardly and downwardly by connection with one end of a walking beam which is rockably supported on the arm, and is operatively connected, at its other end, with reciprocating drive means mounted on the cutter, which is adapted to be actuated by any suitable power source.

A still further object of the invention is the provision of a stone cutter of the character indicated above, wherein the reciprocating drive means is a hydraulic cylinder, having a piston operatively connected to the walking beam, which is adapted to be supplied with fluid under pressure from any suitable source, and wherein three-way valve means is provided and connected in circuit between the source and the cylinder, which is operable for actuating the cylinder to elevate and depress the ram shaft and to hold the ram shaft stationary, in either an elevated, or a depressed position, and to regulate and vary the force with which the ram shaft is worked downwardly to cut stone.

Other important objects and advantageous features of the invention will be apparent from the following description and the accompanying drawings, wherein, for purposes of illustration only, a specific form of the invention is set forth in detail.

In the drawings:

FIGURE 1 is a perspective view of a stone cutter in accordance with the present invention;

FIGURE 2 is an enlarged side elevation of FIGURE 1, showing the ram shaft in a partially depressed position in full lines, and in an elevated position in phantom lines;

FIGURE 3 is a front end elevation of the cutter;

FIGURE 4 is a top plan view thereof;

FIGURE 5 is an enlarged fragmentary vertical transverse section taken on the line 5—5 of FIGURE 3;

FIGURE 6 is a fragmentary horizontal section taken on the line 6—6 of FIGURE 5;

FIGURE 7 is an enlarged fragmentary vertical longitudinal section taken on the line 7—7 of FIGURE 1; and FIGURE 8 is a diagrammatic view showing the hydraulic circuit of the cutter.

Referring in detail to the drawings, wherein like numerals designate like parts throughout the several views, the illustrated stone cutter comprises a flat and preferably rectangular base 10 having longitudinal side edges 12, and forward and rear edges 14 and 16, respectively. Located centrally upon and extending longitudinally of the base 10, and equally spaced from its side edges 12, and suitably fixed in place thereof, and permissibly integral with the base, is a low profile bed 18 having a flat horizontal upper surface 20, and a forward end 22 which is substantially flush with the forward edge 14 of the base 10. A preferably rectangular cross section column or standard 24 rises perpendicularly from the base 10, at the rear end of and in line with the bed 18, and is spaced forwardly from the rear edge 16 of the base. The standard 24 merges, at its upper end, in a forwardly extending generally horizontal arm 26, which is spaced parallel above the bed 18 and has a forward end 28 which extends beyond the forward end 22 of the bed 18. A vertical hydraulic cylinder 30 is transversely pivoted on the base 10, behind the standard 24, and in line therewith, as indicated at 32, and has an upstanding piston rod 34, having a clevis 36, on its upper end, across which a pivot pin 38 extends.

The arm 26 is provided, adjacent to its forward end 28, at a location forwardly of the forward end 22 of the bed 18, with a vertical cylindrical bore 40 which is perpendicular to the bed, and, as shown FIGURES 5 and 6, has a bearing sleeve 42 suitably secured thereon. The bearing sleeve 42 is composed of vertically spaced sections 44 and 46, and the space 48 therebetween is in communication with a lubricating fitting 50, mounted on one side of the arm, by means of a passage 52 extending in the arm 26 between the fitting 50 and the space 48, for lubricating a vertical cylindrical ram shaft 54 which slides through the bearing sleeve 42.

The ram shaft 54 has a fixed clevis 56, on its upper end, cross which a pivot bolt 58 extends, which is journalled through a generally horizontal walking beam 60, at the forward end 62 thereof. The walking beam 60 is preferably a longitudinally elongated plate, positioned in a vertical plane, and having a downwardly reaching middle portion 64, and being journalled, at its rear end, in the piston rod clevis 36, on the pivot pin 38. The walking beam 60 is centered along and is spaced above the arm 26 and is rockably mounted thereon, at the rear end of the arm 26.

Mounting means for the walking beam 60 preferably comprises vertical flat bars 66 engaged with opposite sides of the midlength part of the walking beam and extending below its middle portion 64. The bars are fixed to the walking beam, at their upper ends, as by means of a bolt 68 extending therethrough and through the walking beam. A pivot bolt 70 extends through the bars 66, at their lower ends, and through an upstanding ear 71. The ear 71 is centered on the top cross member 72 of a rectangular frame 74 which has vertical side members 76 engaged with the opposite sides of the arm, immediately in front of the standard 24, and a bottom cross member 78 which is engaged with the undersurface of the arm 26. A bolt 80 is extended through the frame side members 76 and the arm 26, to hold the frame 74 in place.

The ram shaft 54 is provided, on its lower end, with a cutting blade assembly 82 which comprises a socket 84, in which the lower end of the shaft is secured non-rotatably, as by means of a radial pin 86. The socket 84 is preferably cylindrical and has, extending downwardly from its rear side, an eccentric lug 88 having a flat forward face 90 which is parallel to the axis of the shaft 54 and is disposed at right angles to the longitudinal centerline of the bed 18. A flat, transversely elongated blade 92, has a central upstanding portion 94 which bears against the forward face 90, and is fixed thereto, as by means of weldings 96. The cutting blade 92 has a longitudinally curved convex lower edge 98, which is bevelled, at its rear side, so as to provide a sharp cutting edge 100, at the forward side of the blade which is in line with the axis of the shaft 54. As shown in FIGURE 2, the blade 92 is spaced forwardly from the forward edge 22 of the bed 18, and is located to engage the rear side of a stone holding blade 102, in shearing relation thereto.

The stone holding blade 102 is a flat horizontal elongated plate, which is longer than the forward end 22 of the bed 18, and is disposed in a vertical plane parallel to the cutting blade 92. The holding blade 102 is of the same length as and is removably secured to the forward side of a horizontally elongated spacer block 104, as by means of bolts 106 extending through the ends of the blade 102 and through the block 104 and a mounting plate 108. The mounting plate 108 is wider than the spacer block 104, and, as shown in FIGURE 7, is preferably as wide as the combined thicknesses of the base 10 and the bed 18, and is fixed to the forward edges thereof, as by means of weldings 110. The holding blade 102 has a plurality of longitudinally spaced upstanding teeth 112 thereon, here shown as three teeth, of truncated isoceles triangular shape. The tops and sides of the teeth 112 are bevelled on their rear sides, so as to define sharp edges 114. As shown in FIGURE 2, the rear surface 116 of the holding blade 102 is located and positioned to be parallel to the forward surface 118 of the cutting blade 92. The teeth 112 of the stone holding blade 102 serve to dig into the underside of a stone (not shown) laid upon the upper surface 20 of the bed 18 and over the teeth 112, so that the stone will not be shifted, relative to the bed 18 and to the cutting blade 92, as the cutting blade 92 contacts and is driven downwardly in the stone, as the ram shaft 54 is driven downwardly by upward movement of the piston rod 34 of the hydraulic cylinder, produced by introduction of fluid under pressure into the lower end of the cylinder 30, through a first pressure hose 120. Upward retraction of the ram shaft 54 for retracting the cutting blade 92 upwardly away from the base 10, is produced by introduction of fluid under pressure into the upper end of the cylinder 30, through a second pressure hose 122.

The hoses 120 and 122 are severally connected to a manual valve assembly 124 which comprises a vertical bracket 126 which is fixed, at its lower end, as indicated at 128, to the outer end of a lateral boss 130 at the outer end of the arm 26, and a vertical tubular valve body 132, secured, as indicated at 134, to the rear side of the bracket 126. As indicated in FIGURE 8, the valve body 132 has a vertical bore 136 and closed ends and has vertically spaced ports 138 and 140 in its sidewall, to which the pressure hoses 122 and 120, respectively, are severally connected, and transversely aligned ports 142 and 144, in opposite sides of the sidewall to which a fluid pressure input hose 146 and a fluid return hose 148, respectively, are severally connected. The fluid return port 144 is located between the ports 138 and 140. The fluid pressure hose 146 leads from a fluid reservoir 150, and has a motor-driven pump P incorporated therein, with a pressure regulator 152 following the pump. The fluid return hose 148 leads to the reservoir 150, and a by-pass pipe 154 connects the hoses 146 and 148, at a point beyond the regulator 152, and includes a pressure regulator 156.

A valve core 158 slides endwise in the valve body bore 136 and includes an axial shaft 160 which is smaller in diameter than the bore 136, which has an upper end portion 162 which extends through an opening 164 provided in the upper end wall 166 of the valve body. An upstanding bracket 168 on the upper end wall 166 carries a pivot pin 170 on which is pivoted a valve operating lever 172, which has a pin-and-slot connection 174 with the upper end portion 162 of the valve core shaft 160.

The valve core 158 further comprises a full diameter head 176, on its lower end, a full diameter head 178, at its upper end, and a reduced diameter, eccentric intermediate head 180, spaced between the heads 176 and 178. In its side facing the fluid pressure ports 138 and 140, and 144, the intermediate head has a longitudinal slot 182, which is long enough, when the slot 182 is registered with any two of these ports, to close off communication between them and the bore 136 of the valve body 132. When, as shown in FIGURE 8, the core 158 is in its top position, the lower core head 176 blocks the port 140, and the intermediate head 180 blocks the port 138, while the ports 142 and 144, are open to the bore 136, and the pressure input hose 146 and the fluid return hose 148 are in circuit with each other. When the valve operating lever 172 is elevated, the core 158 is depressed, to the desired degree, so as to provide either partial or full communication between the pressure input port 142 on the fluid return port 144, and the valve body bore 136, and hence with either the hydraulic cylinder hose 120 or the hose 122, for elevating and depressing the piston rod 34 of the hydraulic cylinder 30. Elevation of the piston rod 34 produces downward operative depression of the ram shaft 54, for cutting stone.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A stone cutter comprising a stone supporting bed, an upstanding toothed stone holding blade fixed on said bed, a standard rising from one end of said bed, a forwardly-extending horizontal arm fixed on said standard and spaced above said bed, a vertical ram shaft mounted in the free end of said arm for up-and-down movement, a walking beam overlying and extending along said arm and pivotally connected intermediate its ends to said arm for rocking movement of said beam relative to said arm, one end of said walking beam being pivotally connected to the upper end of said shaft, a vertical cutting blade fixed on the lower end of the ram shaft in shearing relation with the holding blade, and means operatively connected to the other end of said beam for effecting the rocking movement of said beam to thereby cause up-and-down movement of said ram shaft.

2. A cutting machine comprising a base, having forward and rear ends, a vertical transverse holding blade fixed on said base at its forward end, a standard rising from said base at its rear end, a forwardly extending horizontal arm fixed on said standard and spaced above the base, a bed on said base between the holding blade and the standard, a vertical fluid pressure cylinder pivoted on the base behind the standard and having an upstanding piston rod, a generally horizontal walking-beam overlying and extending along said arm, said beam being pivoted intermediate its ends on said arm and articulated at its rear end to said piston rod, a vertical ram shaft sliding through said arm at the forward end of the arm, said ram shaft having an upper end articulated to the forward end of the beam above the arm, said ram shaft having a lower end extending below the arm, a vertical transversely extending cutting blade fixed on the lower end of the ram shaft and positioned in shearing relation to the holding blade, and valve means mounted on the cutter for connection to a source of fluid under pressure, and in circuit with the hydraulic cylinder for elevating and depressing the piston rod and for regulating the force with which the ram shaft is depressed to apply its cutting blade to an object resting upon the bed and the holding blade.

3. A cutting machine comprising a base, having forward and rear ends, a vertical transverse holding blade fixed on said base at its forward end, a standard rising from said base at its rear end, a forwardly extending horizontal arm fixed on said standard and spaced above the base, a bed on said base between the holding blade and the standard, a vertical fluid pressure cylinder pivoted on the base behind the standard and having an upstanding piston rod, a generally horizontal walking-beam overlying and extending along said arm, said beam being pivoted intermediate its ends on said arm and articulated at its rear end to said piston rod, a vertical ram shaft sliding through said arm at the forward end of the arm, said ram shaft having an upper end articulated to the forward end of the beam above the arm, said ram shaft having a lower end extending below the arm, a vertical transversely extending cutting blade fixed on the lower end of the ram shaft and positioned in shearing relation to the holding blade, and valve means mounted on the cutter for connection to a source of fluid under pressure, and in circuit with the hydraulic cylinder for elevating and depressing the piston rod and for regulating the force with which the ram shaft is depressed to apply its cutting blade to an object resting upon the bed and the holding blade, said valve means being mounted on said arm, and having a manual operating lever.

4. A cutting machine comprising a base, having forward and rear ends, a vertical transverse holding blade fixed on said base at its forward end, a standard rising from said base at its rear end, a forwardly extending horizontal arm fixed on said standard and spaced above the base, a bed on said base between the holding blade and the standard, a vertical fluid pressure cylinder pivoted on the base behind the standard and having an upstanding piston rod, a generally horizontal walking-beam overlying and extending along said arm, said beam being pivoted intermediate its ends on said arm and articulated at its rear end to said piston rod, a vertical ram shaft sliding through said arm at the forward end of the arm, said ram shaft having an upper end articulated to the forward end of the beam above the arm, said ram shaft having a lower end extending below the arm, a vertical transversely extending cutting blade fixed on the lower end of the ram shaft and positioned in shearing relation to the holding blade, and valve means mounted on the cutter for connection to a source of fluid under pressure, and in circuit with the hydraulic cylinder for elevating and depressing the piston rod and for regulating the force with which the ram shaft is depressed to apply its cutting blade to an object resting upon the bed and the holding blade, said holding blade comprising a vertical, transversely elongated plate having upstanding longitudinally spaced teeth.

5. A cutting machine comprising a base, having forward and rear ends, a vertical transverse holding blade fixed on said base at its forward end, a standard rising from said base at its rear end, a forwardly extending horizontal arm fixed on said standard and spaced above the base, a bed on said base between the holding blade and the standard, a vertical fluid pressure cylinder pivoted on the base beyond the standard and having an upstanding piston rod, a generally horizontal walking-beam overlying and extending along said arm, said beam being pivoted intermediate its ends on said arm and articulated at its rear end to said piston rod, a vertical ram shaft sliding through said arm at the forward end of the arm, said ram shaft having an upper end articulated to the forward end of the beam above the arm, said ram shaft having a lower end extending below the arm, a vertical transversely extending cutting blade fixed on the lower end of the ram shaft and positioned in shearing relation to the holding blade, and valve means mounted on the cutter for connection to a source of fluid under pressure, and in circuit with the hydraulic cylinder for elevating and depressing the piston rod and for regulating the force with which the ram shaft is depressed to apply its cutting blade to an object resting upon the bed and the holding blade, said holding blade comprising a vertical, transversely elongated plate having upstanding longitudinally spaced teeth, said cutting blade comprising a vertical transversely elongated plate having a longitudinally curved convex lower edge.

6. A cutting machine comprising a base, having forward and rear ends, a vertical transverse holding blade fixed on said base at its forward end, a standard rising from said base at its rear end, a forwardly extending horizontal arm fixed on said standard and spaced above the base, a bed on said base between the holding blade and the standard, a vertical fluid pressure cylinder pivoted on the base behind the standard and having an upstanding piston rod, a generally horizontal walking-beam overlying and extending along said arm, said beam being pivoted intermediate its ends on said arm and articulated at its rear end to said piston rod, a vertical ram shaft sliding through said arm at the forward end of the arm, said ram shaft having an upper end articulated to the forward end of the beam above the arm, said ram shaft having a lower end extending below the arm, a vertical transversely extending cutting blade fixed on the lower end of the ram shaft and positioned in shearing relation to the holding blade, and valve means mounted on the cutter for connection to a source of fluid under pressure, and in circuit with the hydraulic cylinder for elevating and depressing the piston rod and for regulating the force with which the ram shaft is depressed to apply its cutting blade to an object resting upon the bed and the holding blade, said holding blade comprising a vertical, transversely elongated plate having upstanding longitudinally spaced teeth, said cutting blade comprising a vertical transversely elongated plate having a longitudinally curved convex lower edge, the cutting blade being positioned behind the holding blade.

7. A cutting machine comprising a base, having forward and rear ends, a vertical transverse holding blade fixed on said base at its forward end, a standard rising from said base at its rear end, a forwardly extending horizontal arm fixed on said standard and spaced above the base, a bed on said base between the holding blade and the standard, a vertical fluid pressure cylinder pivoted on the base behind the standard and having an upstanding piston rod, a generally horizontal walking-beam overlying and extending along said arm, said beam being pivoted intermediate its ends on said arm and articulated at its rear end to said piston rod, a vertical ram shaft sliding through said arm at the forward end of the arm, said ram shaft having an upper end articulated to the forward end of the beam above the arm, said ram shaft having a lower end extending below the arm, a vertical transversely extending cutting blade fixed on the lower end of the ram shaft and positioned in shearing relation to the holding blade, and valve means mounted on the cutter for connection to a source of fluid under pressure, and in circuit with the hydraulic cylinder for elevating and depressing the piston rod and for regulating the force with which the ram shaft is depressed to apply its cutting blade to an object resting upon the bed and the holding blade, said holding blade comprising a vertical, transversely elongated plate having upstanding longitudinally spaced teeth, said cutting blade comprising a vertical transversely elongated plate having a longitudinally curved convex lower edge, the cutting blade being positioned behind the holding blade, the edges of the teeth of the holding blade and the lower edge of the cutting blade being oppositely bevelled and providing sharp cutting edges.

8. A cutting machine comprising a base, having forward and rear ends, a vertical transverse holding blade fixed on said base at its forward end, a standard rising from said base at its rear end, a forwardly extending horizontal arm fixed on said standard and spaced above the base, a bed on said base between the holding blade and the standard, a vertical fluid pressure cylinder pivoted on the base behind the standard and having an upstanding piston rod, a generally horizontal walking-beam overlying and extending along said arm, said beam being pivoted intermediate its ends on said arm and articulated at its rear end to said piston rod, a vertical ram shaft sliding through said arm at the forward end of the arm, said ram shaft having an upper end articulated to the forward end of the beam above the arm, said ram shaft having a lower end extending below the arm, a vertical transversely extending cutting blade fixed on the lower end of the ram shaft and positioned in shearing relation to the holding blade, and valve means mounted on the cutter for connection to a source of fluid under pressure, and in circuit with the hydraulic cylinder for elevating and depressing the piston rod and for regulating the force with which the ram shaft is depressed to apply its cutting blade to an object resting upon the bed and the holding blade, said holding blade comprising a vertical, transversely elongated plate having upstanding longitudinally spaced teeth, said cutting blade comprising a vertical transversely elongated plate having a longitudinally curved convex lower edge, a socket securably engaged on the lower end of the ram shaft, said socket having a pendant eccentric lug having a forward face, said cutting blade having a rear surface securably engaged with said forward face and a forward surface in line with the axis of the ram shaft.

9. A cutting machine comprising a base, having forward and rear ends, a vertical transverse holding blade fixed on said base at its forward end, a standard rising from said base at its rear end, a forwardly extending horizontal arm fixed on said standard and spaced above the base, a bed on said base between the holding blade and the standard, a vertical fluid pressure cylinder pivoted on the base behind the standard and having an upstanding piston rod, a generally horizontal walking-beam overlying and extending along said arm, said beam being pivoted intermediate its ends on said arm and articulated at its rear end to said piston rod, a vertical ram shaft sliding through said arm at the forward end of the arm, said ram shaft having an upper end articulated to the forward end of the beam above the arm, said ram shaft having a lower end extending below the arm, a vertical transversely extending cutting blade fixed on the lower end of the ram shaft and positioned in shearing relation to the holding blade, and valve means mounted on the cutter for connection to a source of fluid under pressure, and in circuit with the hydraulic cylinder for elevating and depressing the piston rod and for regulating the force with which the ram shaft is depressed to apply its cutting blade to an object resting upon the bed and the holding blade, said bed rising above the base and having an upper surface, said bed and said base having coterminal forward ends, said holding blade comprising a vertical mounting plate fixed to said forward ends, said mounting plate being transversely elongated, a spacer block coextensive with and engaged with the forward side of the mounting plate, said holding blade being of the same length as and engaged with the forward side of the spacer block, and assembling bolts extending through the holding blade, the spacer block, and the mounting plate.

10. A cutting machine comprising a base, having forward and rear ends, a vertical transverse holding blade fixed on said base at its forward end, a standard rising from said base at its rear end, a forwardly extending horizontal arm fixed on said standard and spaced above the base, a bed on said base between the holding blade and the standard, a vertical fluid pressure cylinder pivoted on the base behind the standard and having an upstanding piston rod, a generally horizontal walking-beam overlying and extending along said arm, said beam being pivoted intermediate its ends on said arm and articulated at its rear end to said piston rod, a vertical ram shaft sliding through said arm at the forward end of the arm, said ram shaft having an upper end articulated to the forward end of the beam above the arm, said ram shaft having a lower end extending below the arm, a vertical transversely extending cutting blade fixed on the lower end of the ram shaft and positioned in shearing relation to the holding blade, and valve means mounted on the cutter for connection to a source of fluid under pressure, and in circuit with the hydraulic cylinder for elevating and depressing the piston rod and for regulating the force with which the ram shaft is depressed to apply its cutting blade to an object resting upon the bed and the holding blade, said holding blade comprising a vertical, transversely elongated plate having upstanding longitudinally spaced teeth, said cutting blade comprising a vertical transversely elongated plate having a longitudinally curved convex lower edge, a socket securably engaged on the lower end of the ram shaft, said socket having a pendant eccentric lug having a forward face, said cutting blade having a rear surface securably engaged with said forward face and a forward surface in line with the axis of the ram shaft, said holding blade comprising a vertical plate having longitudinally spaced teeth on its upper edge, said teeth rising above the spacer block, the mounting plate, and the upper surface of the bed.

11. A cutting machine comprising a base, having forward and rear ends, a vertical transverse holding blade fixed on said base at its forward end, a standard rising from said base at its rear end, a forwardly extending horizontal arm fixed on said standard and spaced above the base, a bed on said base between the holding blade and the standard, a vertical fluid pressure cylinder pivoted on the base behind the standard and having an upstanding piston rod, a generally horizontal walking-beam overlying and extending along said arm, said beam being pivoted intermediate its ends on said arm and articulated at its rear end to said piston rod, a vertical ram shaft sliding through said arm at the forward end of the arm, said ram shaft having an upper end articulated to the forward end of the beam above the arm, said ram shaft having a lower end extending below the arm, a vertical transversely extending cutting blade fixed on the lower end of the ram shaft and positioned in shearing relation to the holding blade, and valve means mounted on the cutter for connection to a source of fluid under pressure, and in circuit with the hydraulic cylinder for elevating and depressing the piston rod and for regulating the force with which the ram shaft is depressed to apply its cutting blade to an object resting upon the bed and the holding blade, said bed rising above the base and having an upper surface, said bed and said base having coterminal forward ends, said holding blade comprising a vertical mounting plate fixed to said forward ends, said mounting plate being transversely elongated, a spacer block coextensive with and engaged with the forward side of the mounting plate, said holding blade being of the same length as and engaged with the forward side of the spacer block, and assembling bolts extending through the holding blade, the spacer block, and the mounting plate, said teeth being truncated triangular in shape and having horizontal upper ends and downwardly flaring sides, the sides and the upper ends of the teeth being bevelled to sharp edges.

References Cited in the file of this patent

UNITED STATES PATENTS

| | | |
|---|---|---|
| 1,607,369 | Smith | Nov. 16, 1926 |
| 2,746,447 | Fetch | May 22, 1956 |
| 2,781,036 | Moerbe | Feb. 12, 1957 |
| 2,950,710 | Lenhart | Aug. 30, 1960 |

FOREIGN PATENTS

| | | |
|---|---|---|
| 756,210 | France | Sept. 18, 1933 |